United States Patent [19]

Inoue et al.

[11] Patent Number: 4,817,026
[45] Date of Patent: Mar. 28, 1989

[54] DEVICE AND METHOD FOR FILTERING WEIGHT INDICATIVE SIGNAL FROM WEIGHING DEVICE

[75] Inventors: Shinichi Inoue, Kobe; Yoshiharu Toyoda, Akashi, both of Japan

[73] Assignee: Yamato Scale Company, Limited, Japan

[21] Appl. No.: 46,651

[22] Filed: May 5, 1987

[30] Foreign Application Priority Data

May 29, 1986 [JP] Japan .................................. 61-125079

[51] Int. Cl.[4] .............................................. G06F 15/31
[52] U.S. Cl. ............................ 364/724.01; 364/572; 177/185
[58] Field of Search ..................... 364/724, 572, 575; 177/185

[56] References Cited

U.S. PATENT DOCUMENTS

| 4,037,095 | 7/1977  | Howells et al. ........... 364/575 |
| 4,379,495 | 4/1983  | Cocks et al. ............. 364/575 |
| 4,484,146 | 11/1984 | Naito .................... 330/69  |
| 4,624,331 | 11/1986 | Naito .................... 177/185 |
| 4,705,126 | 11/1981 | Naito .................... 177/185 |

Primary Examiner—David H. Malzahn
Attorney, Agent, or Firm—Senniger, Powers, Leavitt and Roedel

[57] ABSTRACT

A digital filter or an equivalent device for filtering a weight signal provided by a weighing device to remove undesirable oscillatory components caused by mechanical vibration of the weighing device, which is constructed to have a plurality of notch frequencies in its transfer characteristic within and/or near the frequency range including such undesirable oscillatory components by utilizing the principle of transfer function of multiplex progressive averages of a series of sample values extracted from the weight signal.

15 Claims, 4 Drawing Sheets

DEVICE AND METHOD FOR FILTERING WEIGHT INDICATIVE SIGNAL FROM WEIGHING DEVICE

BACKGROUND OF THE INVENTION

This invention relates to a device and method for filtering out undersirable components from an electric signal indicative of a weight value (hereinunder referred to as "weight signal").

The weight signal produced from a weighing device such as strain gauge load cell or force balance generally includes various undersirable components attributable to inherent vibration of the device, loading shock and like in addition to a necessary component indicative of the true weight of product to be weighed. In order to remove such undesriable components, an arrangement such as shown in FIG. 1 has been used, for example, as disclosed in U.S. Pat. No. 4,484,146. As shown, the weight signal from a weighing device 1 is passed through an analog filter 2, amplified by an amplifier 3 and converted into digital form by an analog-to-digital (A/D) convertor 4 for processing. An active filter having a low-pass characteristic, such as Bessel or Butterworth filter, has been used as the analog filter 2.

However, it has been difficult to completely remove the undesirable components by such an analog filter without effecting the response time of the weighing device, and it has been a general practice to add a mechanical vibration absorber. However, this additional mechanical component is undesirable since it complicates the mechanical structure and therefore the machine service and maintenance. Accordingly, it has been desired to remove the undesirable components by purely electrical means.

FIG. 2(a) shows a frequency characteristic of a typical load cell weigher including no mechanical damper, in which the transfer function of the weigher has a resonant peak in some frequency range. In the drawing, curve 5 applies to an unloaded weighing device and curve 6 applies to a loaded weighing device. This means that the peak frequency moves with the weight of product. Such movement is caused not only by load variation but also by mechanical resonance attributable to the device structure. However, such movement can be contained in a specific frequency band "b" as shown by suitably selecting its bandwidth. In order to remove the undesirable oscillatory components, it is necessary to provide some means for obtaining sufficient attenuation in this b-band. The next higher frequency band "c" may also be invaded by some unwanted frequency components attributable to mechanical shock applied, for example, when the device is loaded with product or when the hopper gates are opened. Therefore, it is also desirable to apply some attenuation to the c-band. Thus, the desired attenuation characteristic of vibration damping means will be as shown in FIG. 2(b). In the drawing, the amount of attenuation is indicated by the length of arrows.

SUMMARY OF INVENTION

According to an aspect of this invention, an analog weight signal provided by a weighing device is sampled at high frequency to obtain a time-series of weight data D1, D2, ... as shown in FIG. 4. The successive data D1 to $Dn_1$ (D1 to D10 in FIG. 4) are averaged and the resultant average is indicated as $_1M_1$. Next, the successive data D1 to $Dn+1$ (D2 to D11 in FIG. 4) are averaged and the resultant average is indicated as $_1M_2$. Similar averaging operation is repeated to obtain a time-series of averages $_1M_1, _1M_2, \ldots$ as shown in FIG. 4. Such series of averages are referred to as "progressive averages" and the number $n_1$ (=10 in FIG. 4) is referred to as "averaging number". Next, the successive averages $_1M_1$ to $_1M_{n2}$ ($_1M_1$ to $_1M_{11}$ in FIG. 4) are averaged and the resultant average is indicated as $_2M_1$. The successive data $_1M_2$ to $_1M_{n2+1}$ are averaged and the resultant average is indicated as $_2M_2$. A similar operation is repeated to obtain a time-series of progressive averages $_2M_1, _2M_2, \ldots$ as shown. The first series of progressive averages $_1M_i$ (i=1,2, ...) are referred to as "progressive averages of the first order" and the second series of progressive averages $_2M_i$ (i=1,2, ...) are referred to as "progressive averages of the second order". The "averaging number" of these averages of the second order is $n_2$ (=11 in FIG. 4). By repeating similar operations, progressive averages of the r-th order $_rM_i$ (i=1,2, ...) having the averaging number $n_r$ can be calculated in succession. Such operations are referred to as "progressive average multiplexing operations".

As well-known in those skilled in the field of digital filtering, the transfer function of progressive averages of the first order is given by the following equation.

$$G(j\omega) = \frac{\sin(\frac{1}{2}n_1\omega T)}{n_1\sin(\frac{1}{2}\omega T)} e^{-j\omega \frac{n_1-1}{2} T} \quad (1)$$

The former part of this equation is representative of the amplitude characteristic and the latter exponential part thereof is representative of the phase delay. In the equation, T denotes the sampling interval or period and $\omega$ is equal to $2\pi f$ where f denotes the oscillation frequency. The amplitude characteristic is therefore rewritten as follows:

$$\frac{\sin(n_1\pi Tf)}{n_1\sin(\pi Tf)} = \frac{\sin\phi}{n_1\sin(\phi/n_1)} \quad (2)$$

where
$\phi = n_1\pi Tf$

Accordingly, the amplitude becomes zero when $\phi$ equals $N\pi$ where N is a positive integer. Therefore, if $f_{n1}=1/n_1T$, the zero amplitude occurs at frequencies $Nf_{n1}$. This feature is shown in FIG. 3(a) where the averaging number $n_1$ is assumed as ten (10). The frequencies $Nf_{n1}$ (N=1,2, ...) are referred to as "notch frequencies". Thus, it is understood that the progressive averaging operation has a function of a low-pass filter in the frequency range below $f_{n1}$ and a function of a notch having zero amplitude notches at integral multiples of $f_{n1}$ in the remaining range. The fundamental frequency $f_{n1}$ is a function of the reciprocal of the product of the sampling interval T and the averaging number $n_1$, as assumed above. The phase delay $\theta$ is given as follows from Equations (1).

$$\theta = -\frac{n_1-1}{2}\omega T = -\pi \frac{n_1-1}{n_1} \cdot \frac{f}{f_{n1}} \quad (3)$$

This feature is shown in FIG. 3(b).

The amplitude characteristic of progressive averages of the second order can be given similarly by the following equation.

$$|G| = \frac{\sin(\pi n_1 Tf)\sin(\pi n_2 Tf)}{n_1 n_2 \sin^2(\pi Tf)} \qquad (4)$$

This characteristic is shown in FIG. 3(c) where $n_1=10$ and $n_2=11$. As is understood therefrom, the progressive average multiplexing operation has a function of a notch filter having a low-pass characteristic in which zero amplitude notches occur at frequencies $Nf_{n1}$ and $Nf_{n2}$ ($N=1,2,\ldots$) and a considerably or substantially effective damping characteristic in the frequency range above $f_{n1}$. Accordingly, an ideal filtering characteristic as shown in FIG. 2(b) can be obtained by suitably selecting the values of T, $n_1$ and $n_2$ so that the frequencies of $f_{n1}$ and $f_{n2}$ are located in the b-band of FIG. 2. It is readily understood that an improved filtering characteristic is obtainable in the frequency range above $f_{n1}$ by increasing the times of multiplexing and suitably selecting the respective averaging numbers.

As understood from FIG. 4, eleven progressive averages of the first order from $_1M_1$ to $_1M_{11}$ are needed for calculating the first progressive average of the second order $_2M_1$. Twenty successive weight data D1 to D20 are needed for calculating these eleven progressive averages of the first order. The sampling operation of these twenty data requires a time equal to 19T. The value "19" corresponds to a difference between the total of averaging numbers ($n_1+n_2=10+11=21$ in this example) and the order number "r" of progressive averages (r=2 in this example). Thus, the delay of the response is given as a function of the averaging numbers $n_i$ (n=1,2, ... r), the sampling period T and the order number r and, therefore, a sufficiently high speed response can be obtained by suitably selecting these values.

A similar result is obtainable from a weighting operation which is equivalent to the above-mentioned progressive average multiplexing operation or from a digital filter having a filtering characteristic equivalent to this weighting operation. As well known in the art, the transfer function of progressive averages having the averaging number $n_1$ is given in Z-transform fashion as the under.

$$G_1(Z) = \frac{1 + Z^{-1} + Z^{-2} + \ldots + Z^{-(n_1-1)}}{n_1} = \qquad (5)$$

$$\frac{1}{n_1} \cdot \frac{1 - Z^{-n_1}}{1 - Z^{-1}}$$

This is named as a "averaging filter of the first order". A Z-transform representation of an averaging filter of the r-th order is as the under.

$$G_r(Z) = \frac{1}{n_1 n_2 \ldots n_r} \cdot \frac{(1 - Z^{-n_1})(1 - Z^{-n_2})\ldots(1 - Z^{-n_r})}{(1 - Z^{-1})^r} \qquad (6)$$

This equation can be expanded as follows.

$$\begin{aligned} G_r(Z) &= \frac{1}{n_1 n_2 \ldots n_r} [1 + b_1 Z^{-1} + b_2 Z^{-2} + \ldots \\ &\quad b_{(n_1+n_2+\ldots+n_r-r)} Z^{-(n_1+n_2+\ldots+n_r-r)}] \\ &= C[1 + b_1 Z^{-1} + b_2 Z^{-2} + \ldots \\ &\quad b_{(n_1+n_2+\ldots+n_r-r)} Z^{-(n_1+n_2+\ldots+n_r-r)}] \end{aligned} \qquad (7)$$

This equation can be realized in a non-recursive filter having a configuration as shown in FIG. 5 by suitably selecting the weighing factors C, $Cb_1$, $Cb_2$, .... The sampled data are supplied to this filter from the left and shifted rightward one by one through a series of blocks $7_1$, $7_2$, $7_{n1+n2+\ldots+n_r-r}$ for sequentially delaying by a plurality of unit delay times (sample times). The shifted data are multiplied respectively by the weighting factors C, $Cb_1$ $CB_2$, ... in the corresponding multipliers $8_0$, $8_1$, $8_2$, $8_{n1+n2+\ldots+n_r-r}$, and the resultant products are summed in a summer 9. The desired filtered output signal is delivered from the summer 9.

The above-mentioned arithmetic operation can be effected also by commercially available elements such as those sold by Japan Precision Circuit Corp. or Analog Devices Corp. Moreover, it can be effected in real time by utilizing a microcomputer.

Equation 7 can be realized also as a recursive/non-recursive filter. An example thereof is shown in FIG. 6. This example corresponds to progressive averages of the third order. In the drawing, a phantom block $10_1$ effects the operation of Equation (5) for progressive averaging of the first order. The succeeding blocks $10_2$ and $10_3$ have the same configuration as the block $10_1$ and effect the average multiplexing operation. This operation can be effected also by a microcomputer.

These and other objects and features of this invention will be described in detail below with reference to the accompanying drawings.

DESCRIPTION OF PREFERRED EMBODIMENTS

Figure 1:
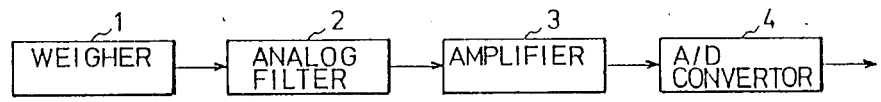
FIG. 1 is a block diagram of a filtering arrangement for a weight signal according to the prior art.
Figure 2A:
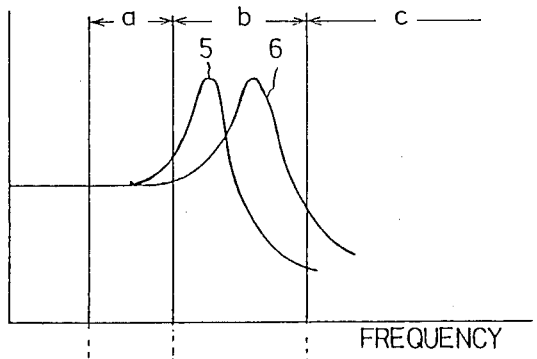
FIG. 2(a) is a diagram representing the frequency characteristic of a typical load cell weigher including a resonant frequency range.
Figure 2B:
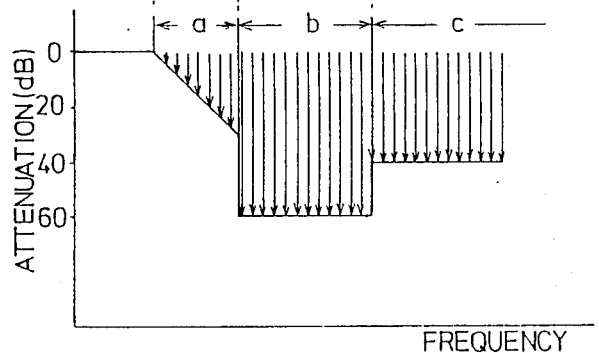
FIG. 2(b) is a diagram representing an ideal filtering characteristic of the filtering device of this invention.
Figure 7:
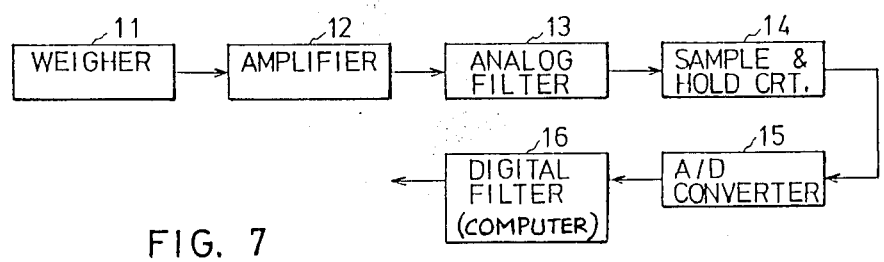
FIG. 7 is a block diagram of a filtering arrangement according to this invention.
Figure 3A:
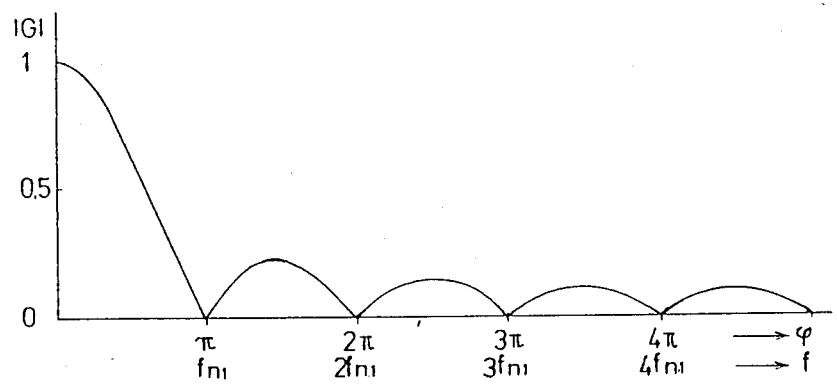
FIG. 3(a) is a frequency-amplitude characteristic diagram for progressive averages of the first order.
Figure 3B:
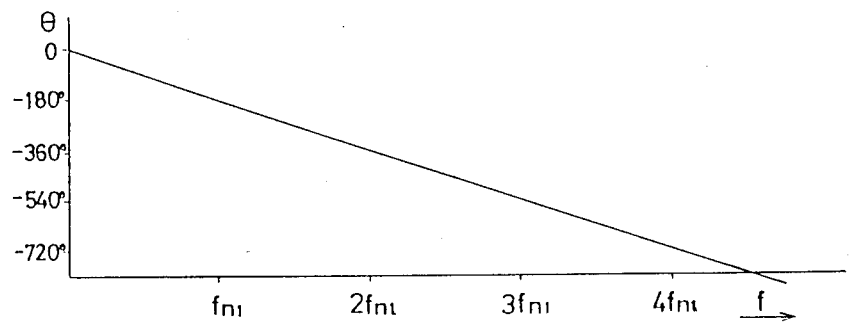
FIG. 3(b) is a frequency-phase delay characteristic diagram for progressive averages of the first order.
Figure 3C:
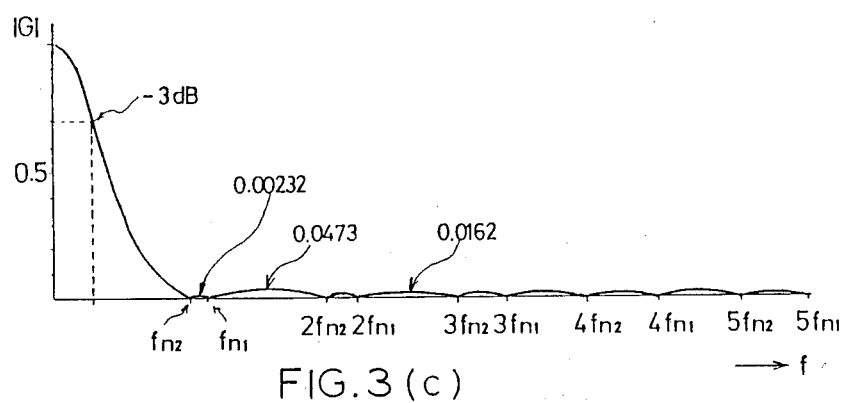
FIG. 3(c) is a frequency-amplitude characteristic diagram for an example of the progressive averages of the second order.
Figure 4:
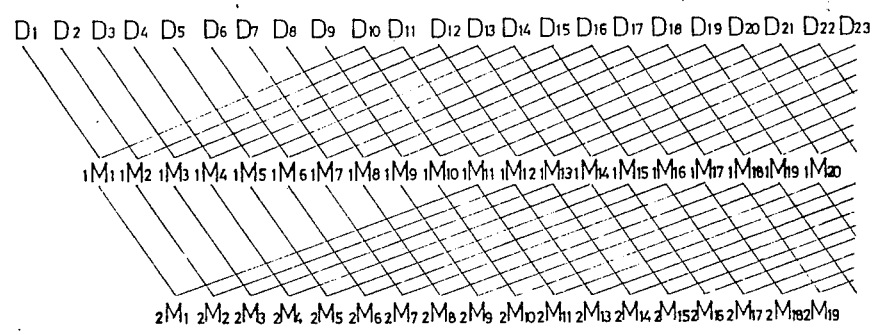
FIG. 4 is a diagram for explaining the calculation of progressive averages.
Figure 5:
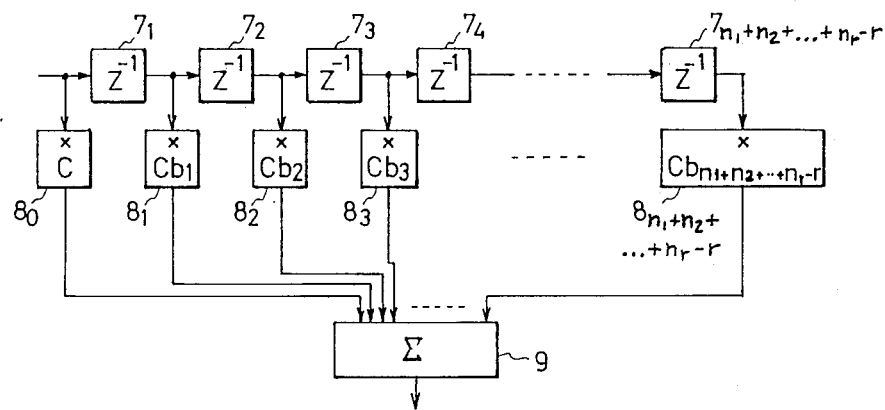
FIG. 5 is a diagram representing a non-recursive filter which is an embodiment of this invention.
Figure 6:
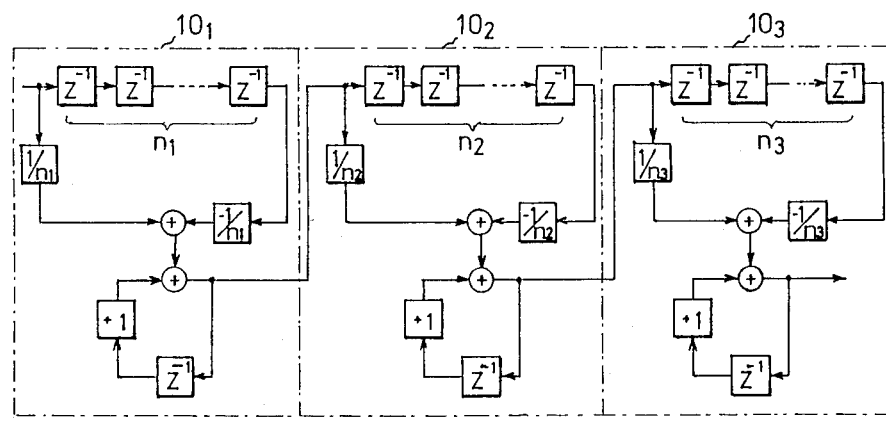
FIG. 6 is a diagram representing a compatible recursive/non-recursive filter which is another embodiment of this invention.

Referring to FIG. 7, 11 denotes a weighing device used in a weight sorting machine or a combination weighing machine, which includes a weighing cradle or hopper having a relatively large tare weight and whose weighing range is relatively narrow. In such weighing device, the difference between the resonance frequency in the no-load state, namely, the inherent vibration frequency and the resonance frequency in the full-load state is small and the b-band of FIG. 2 is relatively narrow. For example, the tare weight is 2000 grams, the full load is 400 grams, the inherent vibration frequency is 19.3 Hz and the resonance frequency in the fullload state is 17.6 Hz.

The weight signal is amplified by an amplifier 12 and filtered by an analog filter 13. The filtered weight signal is sampled at a predetermined frequency in a sample-and-hold circuit 14 and the resultant samples are digitized by an analog-to-digital (A/D) convertor 15 and applied to a digital filter 16. The purpose of analog filter 13 is to compensate for insufficient filtering by the digital filter 16 in the frequency range above a half of the sampling frequency and it may be a Bessel filter of 32 Hz 4-th order type when the sampling frequency is 200 Hz (or the sampling interval T is 0.005 second), for example. The digital filter 16 may be a FIR (finite impulse response) filter which is a non-recursive filter having a function of calculating progressive averages of the third order where $n_1 = 10$, $n_2 = 11$ and $n_3 = 12$.

For this exemplary digital filter 16, Equation (6) is written as follows.

$$G(Z) = \frac{1}{10 \times 11 \times 12} \frac{(1 - Z^{-10})(1 - Z^{-11})(1 - Z^{-12})}{(1 - Z^{-1})^3}$$

When this equation is expanded in accordance with Equation (7), the value of C is 1/1320 and the coefficients $b_i$ ($i = 1, 2, \ldots$) are as shown in the following table.

TABLE 1

| EXPONENT OF Z | COEF. $b_i$ |
|---|---|
| 0 | 1 |
| −1 | 3 |
| −2 | 6 |
| −3 | 10 |
| −4 | 15 |
| −5 | 21 |
| −6 | 28 |
| −7 | 36 |
| −8 | 45 |
| −9 | 55 |
| −10 | 65 |
| −11 | 74 |
| −12 | 81 |
| −13 | 86 |
| −14 | 89 |
| −15 | 90 |
| −16 | 89 |
| −17 | 86 |
| −18 | 81 |
| −19 | 74 |
| −20 | 65 |
| −21 | 55 |
| −22 | 45 |
| −23 | 36 |
| −24 | 28 |
| −25 | 21 |
| −26 | 15 |
| −27 | 10 |
| −28 | 6 |
| −29 | 3 |
| −30 | 1 |

The amplitude characteristic of this digital filter is given as the under.

$$|G| = \frac{1}{n_1 n_2 n_3} \frac{\sin(\pi n_1 Tf)\sin(\pi n_2 Tf)\sin(\pi n_3 Tf)}{\sin^3(\pi Tf)}$$

Figure 8:
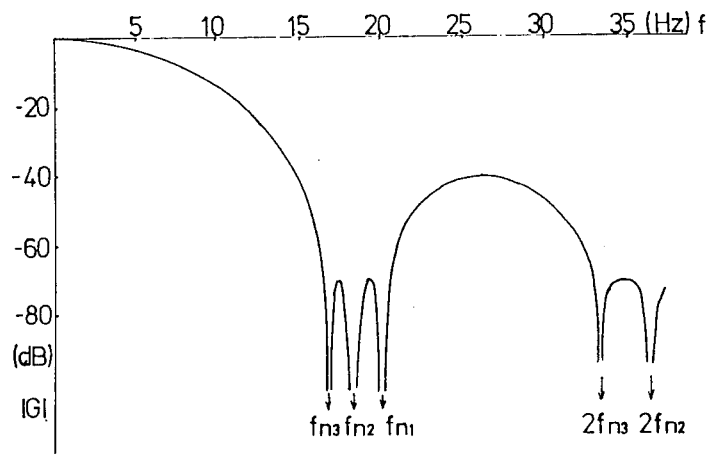
FIG. 8 is a frequency characteristic diagram of the arrangement of FIG. 7.

This characteristic is shown in FIG. 8. As shown, notches appear at frequencies $f_{n3}$ (=16.66 Hz), $f_{n2}$ (=18.18 Hz), $f_{n1}$ (=20 Hz), $2f_{n3}$ (=33.33 Hz), $2f_{n2}$ (=36.36 Hz), $2f_{n1}$ (=40 Hz), . . . respectively corresponding to $n_3$, $n_2$ and $n_1$. Three notches at $f_{n3}$, $f_{n2}$ and $f_{n1}$ define a frequency band attenuated more than 70 dB between 16.66 Hz and 20 Hz. This band corresponds to the b-band in FIGS. 2(a) and (b). At least about 40 dB attenuation is obtained in the range above 20 Hz (which corresponds to the c-band) and a transition band having attenuation decreasing with frequency is formed in the frequency range below 16 Hz (corresponding to the a-band). Since the resonance frequency of weighing device is 17.6 to 19.3 Hz, large transient oscillation caused in the case of loading can be damped below 1/3000 of the input signal with this digital filter.

Figure 9:
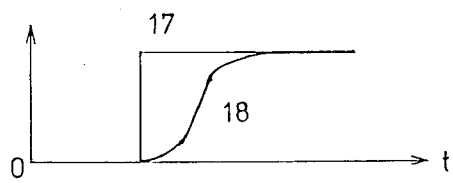
FIG. 9 is a diagram representing a time response characteristic of the arrangement of FIG. 7.

The response of the weighing device varies with the time rate of change of applied load. However, even when the load is applied suddenly as shown by 17 in FIG. 9, the response becomes S-shaped as shown by 18 and no overshoot is caused when this digital filter is used.

The delay of response, which is given as a product of the sampling interval and the greatest exponent of Z in Table 1, is only 0.15 second (=0.005 second×30) and the total time delay resulting from the digital filter and the 32 Hz Bessel filter is only 0.183 second.

As a second example, it is assumed that the tare weight is 50 kilograms, the full load is 150 kilograms, the resonance frequency in no-load state is 45 Hz and the resonance frequency in full-load state is 22.5 Hz. As compared with the first example, the full load is larger relative to the tare wieght and the b-band width is greater. The arrangement of this example is similar to that of the first example, except that the sampling frequency is 180 Hz and the digital filter 16 corresponds to a progressive averaging operation of the fourth order wherein the averaging numbers $n_1$, $n_2$, $n_3$ and $n_4$ are 5, 7, 8 and 18, respectively.

The transfer function of this digital filter is given as follows in Z-transform expression.

$$G(Z) = \frac{1}{5 \times 7 \times 8 \times 18} \frac{(1 - Z^{-5})(1 - Z^{-7})(1 - Z^{-8})(1 - Z^{-18})}{(1 - Z^{-1})^4}$$

Its amplitude characteristic is given as follows.

$$|G| = \frac{1}{n_1 n_2 n_3 n_4} \frac{\sin(\pi n_1 Tf)\sin(\pi n_2 Tf)\sin(\pi n_3 Tf)\sin(\pi n_4 Tf)}{\sin^4(\pi Tf)}$$

Figure 10:
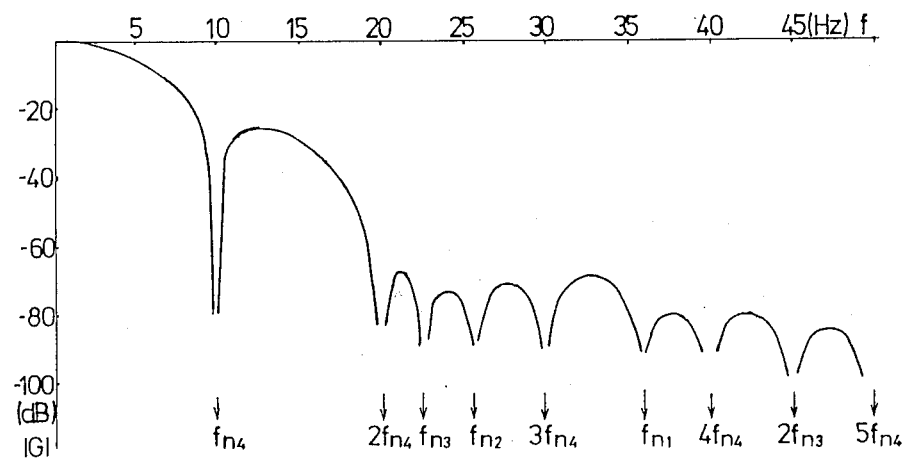
FIG. 10 is a frequency characteristic diagram of a further embodiment of this invention.

The weighting factors $Cb_i$ of this digital filter amount to thirty-five and are calculated by expanding the former equation in accordance with Equation (7). FIG. 10 shows the attenuation characteristic of this filter. While the desired attenuated frequency band is 20 to 50 Hz in this example, effective attenuation is obtained by this filter up to 90 Hz which is about a half of the sampling frequency of 180 Hz, though the region above 50 Hz is not shown in the drawing. The notch at $f_{n4}(=10 \text{ Hz})$ is provided for forming a transition band having a suitable attenuation in the region below 20 Hz. The other notches are formed at $2f_{n4}(=20\text{Hz})$, $3f_{n4}(=30 \text{ Hz})$, $4f_{n4}(=40 \text{ Hz})$, ... $f_{n3}$ (22.5 Hz), $2f_{n3}$ (=45 Hz), $3f_{n3}$ (=67.5 Hz), $4f_{n3}$ (=90 Hz), ... $f_{n2}$ (=25.71 Hz), $2f_{n2}$ (=51.42 Hz), $3f_{n2}$ (=77.13 Hz), $4f_{n2}$ (=102.84 Hz), ... $f_{n1}$ (=36 Hz), $2f_{n1}$ (=72 Hz), $3f_{n1}$ (=108 Hz), $4f_{n1}$ (=144 Hz), .... Thus, attenuation above −66 dB (i.e. 1/2000) has been achieved in the frequency range above 20 Hz.

As aforedescribed, the response time of this digital filter is calculated as $(1/180) \times (38-4) = 0/189$ second. This delay of response is negligible small in practice even when the response time of the analog filter 13, which is about 0.033 second, is included.

Higher attenuation can be obtained by constructing the digital filter corresponding to a higher order of progressive averaging. The arithmetic operation effected by the digital filter may be effected by a microcomputer.

The following Table 2 shows the result of comparison of the inventive digital filter with two kinds of prior art analog filters. In the table, the filters A and B are respectively 2nd order and 4th order Bessel type analog filters and C is the above-described digital filter in FIG. 8, each of the filters having the same response time. The table shows that the attenuation characteristic of C is excellent as compared with A or B. In practical application, the lower the break point frequency in A and B, the better the attenuation characteristic, but the response will also be degraded.

TABLE 2

| Filter | Break point freq. | Attenuation ratio 18 Hz | 26.66 Hz |
|---|---|---|---|
| A | 7.77 | 0.187 | 0.085 |
| B | 10 | 0.095 | 0.020 |
| C | — | (16–20 Hz) <0.00029 | 0.0095 |

This table clealy shows improved filtering characteristic of the device of this invention.

We claim:

1. A device for filtering a weight signal of a weighing device, the weight signal having undesirable components in a frequency range including oscillatory components determined by the weighing range of said weighing device and/or strong resonance components caused by said weighing device, said filtering device comprising means for sampling said weight signal to provide a series of sample signals, and arithmetic means for arithmetically processing said sample signals according to a transfer characteristic, characterized in that the transfer characteristic of said arithmetic means corresponds to a transfer function of multiplex progressive averages of said sample signals, and said arithmetic means includes means for selecting the averaging numbers of the respective orders of the progressive averages to provide a plurality of notch frequencies within and/or near said frequency range.

2. A device as set forth in claim 1, characterized in that said arithmetic means is a computer.

3. A device as set forth in claim 1, characterized in that said arithmetic means is a digital filter.

4. A device as set forth in claim 3, characterized in that said digital filter is a non-recursive filter.

5. A device as set forth in claim 3, characterized in that said digital filter is a compatible non-recursive/-recursive filter.

6. A method of filtering a weight signal of a weighing device, the weight signal having undesirable components in a frequency range including oscillatory components determined by the weighing range of said weighing device and/or strong resonance components caused by said weighing device, the method of filtering comprising the steps of sampling said weight signal to provide a series of sample signals, and arithmetically processing said sample signals to provide a filtered output, characterized in that said arithmetic processing step includes a step of calculating multiplex progressive averages of said sample signals, said calculating step including the step of selecting the averaging number of each order of said multiplex progressive averages so that a plurality of notch frequencies appear within and-/or near said frequency range.

7. A method of filtering a weight signal of a weighing device, the weight signal having undesirable components in a frequency range including oscillatory components determined by the weighing range of said weighing device and/or strong resonance components caused by said weighing device, the method of filtering comprising the steps of sampling said weight signal to provide a series of sample signals, and arithmetically processing said sample signals to provide a filtered output, characterized in that said arithmetic processing step includes an operation corresponding to a multiplex progressive averaging operation of said sample signals in which an averaging number of each order is selected so that a plurality of notch frequencies appear within and/or near said frequency range.

8. A device for filtering an analog weight signal from a weighing apparatus, the weight signal having undesirable components in a frequency range, the device comprising:
means for sampling the weight signal;
means for converting the sampled weight signal to a digital signal; and
means for producing multiplex progressive averages of the digital signal having averaging numbers of the respective orders of the progressive averages to provide notch frequencies within and/or near said frequency range thereby to generate a digitally filtered signal.

9. A device as set forth in claim 8 wherein said sampling means samples the weight signal at a predetermined sampling frequency comprises and analog filter for filtering the weight signal to remove frequency components in a frequency range above one half of said predetermined sampling frequency.

10. A device as set forth in claim 8 wherein said undesirable components are in a specific frequency band due to oscillatory components determined by a weighing range of the weighing apparatus and/or due to strong resonance components caused by the weighing apparatus, and the producing means has frequency notches within and/or near said specific frequency band.

11. A device as set forth in claim 8 wherein said producing means include a non-recursive filter.

12. A device as set forth in claim 11 wherein said filter includes means for sequentially delaying by a first through $(n_1+n_2+ \ldots +n_r-r)$th order the digital signals, means for multiplying the input of said delay means and each delayed digital signal by a corresponding weighting factor to produce a set of products, and means for summing the products thereby to generate the digitally filtered signal.

13. A device as set forth in claim 8 wherein said producing means includes a compatible non-recursive/-recursive filter.

14. A device as set forth in claim 13 wherein said producing means includes means for generating a progressive average of the first order, means responsive to the progressive average of the first order for generating a progressive average of the second order, and means responsive to the progressive average of a prior order for generating a progressive average of a next order thereby to generate said digitally filtered signal.

15. A method of filtering an analog weight signal from a weighing apparatus, the weight signal having undesirable components in a frequency range, said method comprising the steps of:

sampling the weight signal;

converting the sampled weight signal to a digital signal; and producing multiplex progressive averages of the digital signal, the multiplex progressive averages having averaging numbers of the respective orders of the progressive averages to provide notch frequencies within and/or near the frequency range thereby to generate a digitally filtered signal.

* * * * *